J. H. LEHMAN.
SHUTTER FOR MOVING PICTURE MACHINES.
APPLICATION FILED OCT. 27, 1915.
1,349,215. Patented Aug. 10, 1920.
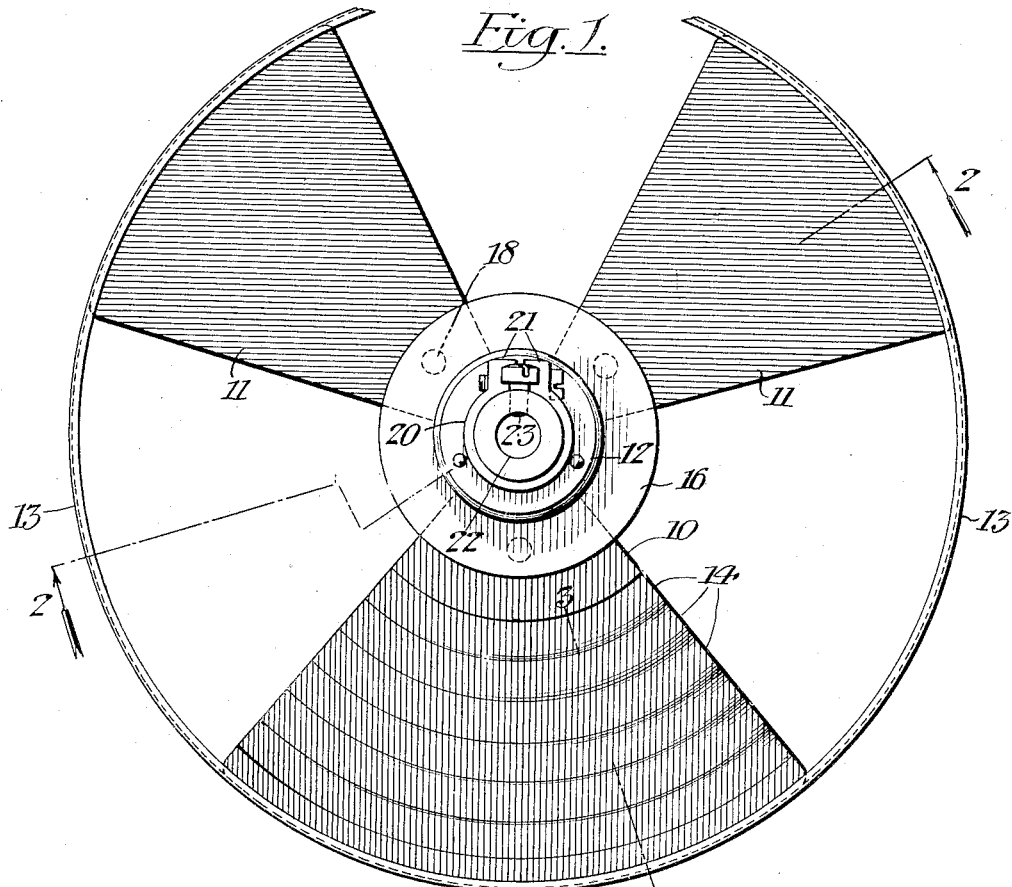
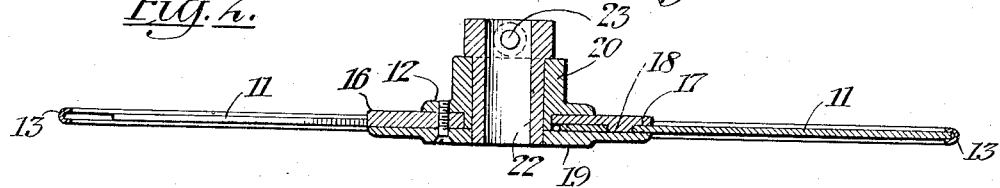
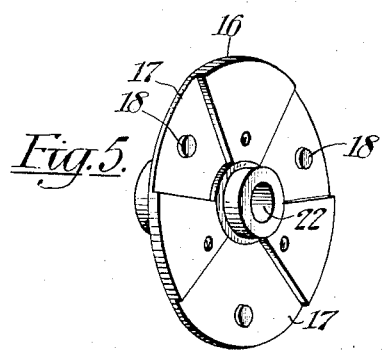
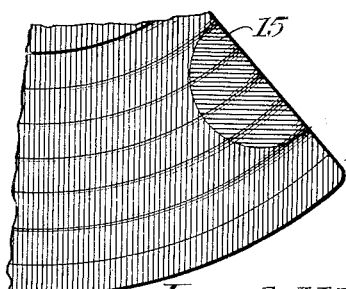
Inventor
Joseph H. Lehman.
By his Attorney
Witness:

ured by having the lenses extend radially
UNITED STATES PATENT OFFICE.

JOSEPH H. LEHMAN, OF NEW YORK, N. Y.

SHUTTER FOR MOVING-PICTURE MACHINES.

1,349,215.  Specification of Letters Patent.  Patented Aug. 10, 1920.

Application filed October 27, 1915. Serial No. 58,158.

*To all whom it may concern:*

Be it known that I, JOSEPH H. LEHMAN, a citizen of the United States, and resident of New York, borough of Manhattan, county and State of New York, have invented certain new and useful Improvements in Shutters for Moving-Picture Machines, of which the following is a specification.

This invention relates to certain improvements in shutters for moving picture machines and more particularly to that type having a picture obscuring blade which, when in the path of the light rays from the projector to the screen, prevents the picture or the film advancement from being seen on the screen.

The main objects of my invention are to reduce or eliminate flicker, increase the amount of light reaching the screen, and secure desired color effects on the screen without necessitating a coloring of the film itself.

As an important feature of my invention, the picture obscuring blade of the shutter is made of transparent material so formed as to constitute one or more refractors which will distort the light rays to a sufficient extent to prevent the formation of a picture, but not to such an extent as will prevent substantially all of the light rays from reaching the screen. By forming one or both surfaces of the picture obscuring blade with surface irregularities, the inclination of the sides of which are comparatively low so that the resulting projections are shallow in respect to their width, the desired results may be secured and by making them in the form of low ridges or grooves, there will be practically no refraction of the light rays toward the two opposite sides of the screen and very little refraction toward the other two sides. By the increased light effect and the increased brilliancy and depth of the picture, a desired clearness as well as other effects are obtained which are not possible with the ordinary shutter.

The light refracting power of the lenses should be such in respect to the distance between the projector and the screen that there will be a uniform distribution of light on the screen, but in case these are not properly proportioned in respect to each other, any increase or decrease of light rays on a particular part of the screen will appear to remain constant during the movement of the lenses across the light rays by arranging these lenses concentric with the axis of rotation so that they move endwise across the light rays. Satisfactory results may be secured by having the lenses extend radially or in any other direction in respect to the axis of the shutter if the lenses be so accurately made and the distance from the refractors to the screen be so accurately proportioned that there will be a uniform distribution, but under commercial conditions, such accuracy is not always practicable. The concentric arrangement of the lenses or refractors and the resulting endwise movement of them eliminates any effect of waves of alternate, excessive, and insufficient illuminated areas passing across the screen.

As a further important feature of my invention, I make the picture obscuring section of the shutter of colored material and use in connection with it one or more transparent flicker blades of a different color. The flicker blades preferably do not have any lenses or refractors and do not have any material light refracting power, and their color is such in respect to the color of the picture obscuring blade that highly artistic light effects are secured on the screen.

By making portions of the shutter red and other portions blue, the successive projecting on the screen of yellowish rays from the source of light, the red rays from one section of the shutter and the blue or violet rays from another section, will neutralize each other and will make the high lights more brilliant and the whites of a purer white than is possible with the ordinary shutter having opaque picture obscuring and flicker blades.

The colored blades of the shutter should not be of such density as will materially reduce the amount of light reaching the screen, but by careful selection of the colors and their density, the screen may be given those tints or colors which are now secured by dyeing or chemically treating the film itself. This is an important feature of my invention. It is well known that the chemicals used in coloring films sepia, blue, green or other colors, often in time chemically affect the film so as to disintegrate it or otherwise ruin it. By the use of shutter blades of properly selected color, the desired color effect may be secured on the screen even though the film itself be merely in black and white. I avoid the expense of coloring the film, avoid injury to the film, and permit a single film to be used with different shutters and give either a black and white, a sepia, or any other desired color on the screen. This may be done by having different colors in the shutter blades which will combine, or by having all of the blades of the same color.

By the use of a crimson picture obscuring blade and an ultra-marine flicker blade, neither the red rays nor the blue rays can be recognized as such, but the picture will appear of a more attractive sepia color than is now secured by coloring the film. Other color effects may be secured by the use of other colors, or combinations of colors. By selecting a color for the shutter in accordance with the character of the scene depicted on the screen, color effects very closely approaching those existing in nature may be secured.

As a further important feature of my invention, I make the blades of the shutter of celluloid or other similar composition and of sufficient thickness so as to be substantially rigid. This is an important advantage over the use of glass inasmuch as it is not readily broken, is of less weight, and may be more easily colored to the desired shade or tint and has a slightly different light refracting action.

As a further important feature of my invention, I provide an improved form of hub, whereby the shutter may be connected to shafts of various sizes and whereby the blades, irrespective of their material, are effectively locked against any tendency to loosen by centrifugal force or by careless handling.

I am aware that shutters for projection machines have been designed in which translucent material has been substituted for the usual opaque material of the obscuration blade, but such translucent material is practical only in case it is so nearly opaque as to prevent the transmission of sufficient light to form the image. The nearer it approaches to transparency, the less practical it becomes, as it then permits the advancement of the film to be noted on the screen. Furthermore, any diffusing of the light tends to produce an objectionable illumination of the room. By forming the obscuration blade of transparent material and providing it with lenses or refractors which destroy the image without either intercepting the light rays or disbursing them to points off the screen, I get almost the full illuminating effect on the screen without the light being scattered about the room and without permitting the advancement of the film to be noted and I reduce the amount of current needed to produce efficient projection.

In the accompanying drawings, I have illustrated a preferred embodiment of my invention, but it is evident that various changes may be made in the construction, arrangement of parts, selection of colors, etc., within the scope of my invention as defined in the appended claims, and therefore I desire the drawings to be considered in an illustrative rather than in a limiting sense.

In these drawings, in which similar reference characters indicate corresponding parts in the several views.

Figure 1 is a plan view of a shutter constructed in accordance with my invention;

Fig. 2 is a transverse section on the line 2—2 of Fig. 1;

Fig. 3 is a transverse section on the line 3—3 of Fig. 2, but on a very much larger scale;

Fig. 4 is a plan view of a portion of a slightly modified obscuration blade; and Fig. 5 is a perspective view of a section of the hub.

In the specific construction illustrated I employ a picture obscuring blade or section 10 and two flicker blades 11 lying in the same plane, spaced apart and secured to a central hub 12. Each of the three blades is formed of transparent material, preferably celluloid, and is sufficiently thick and rigid to retain its form during all ordinary conditions of use or handling. Sheets one-thirtysecond of an inch in thickness are ample for the purpose and preferably they are made slightly thinner. It is not essential that the blades be connected at their outer ends, but in practice, I prefer to employ a rim or peripheral band 13 which serves to prevent any one from being injured by accidentally getting his fingers between the blades when the shutter is rapidly rotating. This peripheral rim is not essential from a standpoint of reinforcement or resisting tendencies toward centrifugal movement of the blades.

The obscuration section 10 is shown as occupying approximately one-fourth of the total space, but this may be varied with the character of the projector with which the shutter is used. It is only essential that the obscuration blade be of such width that it will come into position just before the film advancement starts and will still be in position when the film advancement terminates.

The flicker blades are shown as two in number and each extending through approximately 50° although their number and width may be varied.

The picture obscuring section is formed of transparent material and has molded, cut, etched, or otherwise formed in one or both of its opposite surfaces, a series of light refractors or lenses. In the specific form illustrated, these are formed on only one surface and are in the form of ridges 14, separated by grooves, the ridges and grooves being concentric with the axis of rotation of the shutter and extending from one radial edge of the blade to the other. The ridges are illustrated as being curved and the grooves as angular although the reverse might be used if desired. That is, the grooves might be concave and the ridges angular. The surfaces of the ridges might be straight instead of curved and of a wider or narrow width if desired. It is only essential that the sides of the ridges make a comparatively low angle with the plane of the shutter or the plane of the opposite surface of the blade. The opposed surfaces should approach parallelism but should not be parallel. The steeper the sides of the ridges, the greater will be the light refracting action, but any light refraction more than that necessary to prevent the formation of a picture on the screen and to give a uniform light distribution over the surface of the screen, will act to refract light rays to such an extent that they will not strike the screen, but will be scattered to other parts of the room. This is objectionable in that it cuts down the desired illumination of the screen and gives an undesirable illumination in the room. Thus, the angle which the sides of the ridges or refractors make with the plane of the blade should be selected in accordance with the distance between the projector and the screen and the distance between the lenses of the projector and the shutter. For ordinary commercial purposes, ridges of approximately one-third of an inch in width, of uniform curvature and separated by grooves approximately one-sixtyfourth of an inch in depth, have proven very satisfactory, but it is of course evident that I do not desire to be restricted to these particular proportions or dimensions.

The flicker blades are transparent and may be made of the same material and of substantially the same thickness as the obscuration portion. They are colored or tinted so as to intercept certain of the light rays and thus cut down the amount of illumination of the screen without in any way destroying or distorting the picture. They serve to divide up the period during which the picture is on the screen and to this extent act the same as the ordinary flicker blades in preventing the action of the obscuration portion from being so noticeable. In other words, they prevent that objectionable action known as "flicker."

As an important feature of my invention, I color one portion of the shutter area red and another portion blue so that during each rotation of the shutter, the screen receives red rays, blue rays and yellowish rays from the electric arc forming the source of illumination. This projecting on the screen of red, yellow and blue rays in very rapid succession prevents any of these colors from being separately or individually noted by the observer and if the separate colors be properly proportioned in respect to each other, the net effect will be to make the high lights of the picture more brilliant; the whites a purer white; and other colors more nearly those of nature, due to the combination of these primary colors. Thus, the character of the picture may be materially improved.

By properly selecting the colors and shades, color effects may be secured which heretofore have been secured only by the coloring of the film with its incidental cost and injury to the film. To secure a sepia picture on the screen, the ordinary black and white film may be employed and the separate shutter blades may be made ultra-marine and carmine. In the specific form illustrated I have shown the obscuring portion red and both of the flicker blades blue. I find from experience that a shutter made with the shutter blades as described and of the colors indicated, gives highly satisfactory results, but I do not wish to be limited to these particular colors.

As the obscuration portion of the shutter cannot be reduced in width below a certain limit, dependent upon the relative time required for the film advancement, it is evident that the making of the obscuration portion of the same color throughout its entire width may give an undue prominence to that color on the screen. This may be neutralized by making a portion of the picture obscuring blade of one color and another portion of a different color, or without color. In Fig. 4, I have shown a portion of an obscuration blade similar in all respects to that shown in Fig. 1 except that a semi-circular portion 15 at one edge thereof is colored blue instead of red. This will reduce the amount of red on the screen and will increase the amount of blue.

The obscuration blade might be made without color or of a very light tint if used with very thin films, but ordinarily it should be colored or shaded in order that the proper slight reduction in the illumination of the screen may be secured during the film advancement and the flicker thus eliminated or render so inconspicuous as to be negligible. This might be done by having a part of the obscuration blade colorless and the balance colored, the colorless portion being either of the form shown in section 15 in Fig. 4 or in the form of a strip extending radially or along one or both edges of the blade.

In order to render the change from one color to another less conspicuous, to get a more uniform distribution of color over the screen and to secure color effects more closely corresponding to those of the subject depicted on the screen, the shutter blade area, either in whole or in part, may be sub-divided into small sections and so colored that no two adjacent sections are of the same color. For instance, the whole shutter blade area may be divided into small squares of an eighth of an inch to a side and the various squares colored the three primary colors, red, blue and yellow, or these colors and the secondary colors, orange, green and violet. If it is desired to give the screen any one predominating color, that color may be used in excess of the others so far as area is concerned or so far as density is concerned, and additional colors may be employed if desired. Instead of arranging the various colors in squares or other similar small subdivisions, they might be arranged in narrow, radially extending strips.

For holding the shutter blades rigid in respect to the hub and for securing the shutter to the shaft by which said shutter is rotated, I preferably employ the improved form of hub illustrated. This hub includes an annular metal plate 16 having sector-shaped recesses 17 in one face thereof and studs 18 extending upwardly in each recess. The recesses are of a depth and the studs are of a height corresponding to the thickness of the material constituting the plates. Each plate lies within a corresponding recess and has an opening to receive the stud so that the upper surface of the shutter blade lies flush with the surface of the body portion of the plate. A second plate 19 is rigidly clamped to the plates 16 so as to extend over the base portions of the shutter blades and hold them in the recesses. The two plates may be secured together in any suitable manner as for instance by means of screws. One of the plates, preferably the plate 16, has a hub 20 of a larger diameter than the shaft to which the shutter is to be secured and this hub is slotted lengthwise and provided with outwardly extending lugs 21 which may be drawn together by a clamping screw. A collar 22 extends through the hub 20 and has a set screw 23 whereby said collar may be rigidly secured to the shaft. The external diameter of the collar is substantially equal to the internal diameter of the hub 20 so that by drawing the lugs 21 together, the hub may be locked in the collar. By means of this construction, the shutter, including the hub, may be made of standard construction and the collar 22 may be made of standard external diameter but bored to an internal diameter corresponding to that of the shaft of the projector. Thus, by selecting a collar with an internal diameter corresponding to that of the shaft, a standard shutter may be secured thereto. Thus, the shutter itself is adapted to shafts of various different diameters.

Having thus described my invention, what I claim as new and desire to secure by Letters Patent is:

1. A shutter for moving picture machines, including an obscuration blade formed of transparent celluloid and having one plane surface and having the opposite surface thereof presenting a series of ridges of comparatively low altitude in respect to their width and serving as light refractors.

2. A shutter for moving picture machines, including red and blue blades with open spaces therebetween, one of said blades being formed with smooth-surfaced projections of comparatively low altitude in respect to their width and constituting light refractors.

3. A shutter for moving picture machines including a red, transparent obscuration blade having surface irregularities with polished surfaces constituting refractors and a substantially non-refracting blue flicker blade spaced therefrom.

4. A shutter for moving picture machines, including a hub plate having a series of sector-shaped recesses in one face thereof and a stud within each recess and extending in the direction of the axis, a series of shutter blades each having a portion thereof adapted to fit within a corresponding recess of said plate and having an aperture to receive the stud thereof and a clamping plate secured to said hub plate for holding said blades in position.

5. A shutter for moving picture machines, including a collar, a split hub adapted to be clamped thereto, and a plurality of shutter blades secured to said hub.

6. A shutter adapted for use in connection with moving picture projectors, having a source of illumination emitting yellowish light rays, said shutter having an opening through which said yellowish light rays may pass unchanged to the screen and having transparent portions colored red and blue whereby blended red, blue and yellowish light rays are projected on the screen during the operation of the machine.

7. A shutter for moving picture machines, comprising a section of transparent material of one color maving means for diffusing or destroying the focus of the rays going to the screen, and a second substantially non-light-refracting section of a complementary color.

8. A rotary shutter for use in connection with monochrome films in moving picture machines and adapted to make one complete revolution for each film advancement, including a plurality of sections spaced apart to leave openings therebetween, one of said sections being transparent and of a blue color and another of said sections being transparent and of a red color, and one of said sections having means for diffusing or destroying the focus of the rays going to the screen.

Signed at New York in the county of New York, and State of New York this 15th day of October A. D. 1915.

JOSEPH H. LEHMAN.

Witnesses:
C. W. FAIRBANKS,
FLORENCE LEVER.